United States Patent
Furuya

(10) Patent No.: US 9,552,650 B2
(45) Date of Patent: Jan. 24, 2017

(54) IMAGE COMBINING APPARATUS, IMAGE COMBINING METHOD AND RECORDING MEDIUM STORING CONTROL PROGRAM FOR IMAGE COMBINING APPARATUS

(71) Applicant: FUJIFILM Corporation, Tokyo (JP)

(72) Inventor: Hiroyuki Furuya, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/817,207

(22) Filed: Aug. 3, 2015

(65) Prior Publication Data

US 2016/0063735 A1    Mar. 3, 2016

(30) Foreign Application Priority Data

Aug. 29, 2014  (JP) ................. 2014-175206

(51) Int. Cl.
    *G06K 9/00* (2006.01)
    *G06T 7/40* (2006.01)
    *G06T 11/60* (2006.01)

(52) U.S. Cl.
    CPC ........... *G06T 7/408* (2013.01); *G06K 9/00691* (2013.01); *G06T 11/60* (2013.01)

(58) Field of Classification Search
    CPC ..... G06K 15/189; G06K 9/00691; G06T 3/40; G06T 3/4038; G06T 7/0081; G06T 7/40; G06T 7/408; G06T 2207/10024; G06T 2207/20144; G06T 2207/20221; G06T 11/60; H04N 1/00204; H04N 1/32502; H04N 1/32523; H04N 2201/0089; G09B 5/00; G06Q 30/06; G06Q 30/0601; G06Q 30/0603; G06Q 30/0613; G06Q 30/0621; G06Q 30/0633; G06Q 30/0641; G06Q 30/0643; A47G 1/20; A47G 1/205; A47G 1/06; A47G 1/14; A47G 1/148; A47G 1/0638

See application file for complete search history.

(56) References Cited

U.S. PATENT DOCUMENTS

| | | | |
|---|---|---|---|
| 8,156,244 B2* | 4/2012 | Blair | H04N 1/32411 348/500 |
| 9,336,337 B2* | 5/2016 | Jaquez-Vazquez | G06F 17/5004 |
| 9,351,594 B2* | 5/2016 | Mehra | A47G 1/205 |

(Continued)

FOREIGN PATENT DOCUMENTS

| | | |
|---|---|---|
| JP | 3040074 | 5/2000 |
| JP | 2003-157290 | 5/2003 |

(Continued)

*Primary Examiner* — Jose Couso
(74) *Attorney, Agent, or Firm* — Jianq Chyun IP Office

(57) ABSTRACT

The impression given by a background image is determined, wherein the background image represents the background of a location to be decorated with a picture frame into which a print has been inserted. A picture frame image that gives this impression is found. The image representing the print is corrected so as to give an impression closer to the impression that has been determined. The corrected image is combined with the found picture frame image and the resulting composite image is transmitted to a smartphone. When the composite image is checked and deemed suitable by the user, the print of the corrected image is inserted into an actual picture frame specified by the picture frame image and the picture frame with the inserted print is delivered to the user.

17 Claims, 14 Drawing Sheets

(56) References Cited

U.S. PATENT DOCUMENTS

2007/0166671 A1* 7/2007 Walter ................... G09B 5/00
           434/98
2009/0125421 A1* 5/2009 Ettlinger ............ G06Q 30/0601
           705/26.1

FOREIGN PATENT DOCUMENTS

| JP | 2007-208912 | 8/2007 |
| JP | 4446705 | 4/2010 |
| JP | 4710497 | 6/2011 |
| JP | 5477025 | 4/2014 |

* cited by examiner

Fig. 7

| IMAGE ANALYSIS INFORMATION / IMPRESSION CATEGORY | BRIGHTNESS | CONTRAST | SATURATION | HUE | COLOR BALANCE | SPATIAL FREQUENCY |
|---|---|---|---|---|---|---|
| CUTE | EQUAL TO OR GREATER THAN L7 | L3 TO L5 | L3 TO L5 | --- | --- | --- |
| PRETTY | EQUAL TO OR GREATER THAN L7 | L3 TO L6 | L4 TO L7 | --- | --- | --- |
| ELEGANT | EQUAL TO OR GREATER THAN L6 | L2 TO L4 | L2 TO L4 | --- | --- | --- |
| NATURAL | EQUAL TO OR GREATER THAN L5 | L2 TO L5 | L2 TO L5 | --- | --- | --- |
| --- | --- | --- | --- | --- | --- | --- |

*Fig. 13*

RESULTS OF BACKGROUND IMAGE ANALYSIS

| BRIGHTNESS | CONTRAST | SATURATION | HUE | COLOR BALANCE | SPATIAL FREQUENCY |
|---|---|---|---|---|---|
| L 8 | L 3 | L 3 | — | — | — |

Fig. 14

RESULTS OF PICTURE FRAME IMAGE ANALYSIS

| PICTURE FRAME NO. | IMAGE ANALYSIS INFORMATION | | | | | | |
|---|---|---|---|---|---|---|---|
| | BRIGHTNESS | CONTRAST | SATURATION | HUE | COLOR BALANCE | SPATIAL FREQUENCY | SCENE |
| No. 1 | L8 | L5 | L4 | --- | --- | --- | --- |
| No. 2 | L8 | L6 | L4 | --- | --- | --- | --- |
| No. 3 | L3 | L2 | L7 | --- | --- | --- | --- |
| No. 4 | L3 | L8 | L8 | --- | --- | --- | --- |
| --- | --- | --- | --- | --- | --- | --- | --- |

IMAGE COMBINING APPARATUS, IMAGE COMBINING METHOD AND RECORDING MEDIUM STORING CONTROL PROGRAM FOR IMAGE COMBINING APPARATUS

CROSS-REFERENCE TO RELATED APPLICATIONS

The present application claims priority under 35 U.S.C. §119 to Japanese Patent Application No. 2014-175206 filed Aug. 29, 2014. Each of the above application(s) is hereby expressly incorporated by reference, in its entirety, into the present application.

BACKGROUND OF THE INVENTION

Field of the Invention

This invention relates to an image combining apparatus and image combining method as well as a recording medium storing a program for controlling an image combining apparatus.

Description of the Related Art

When decoratively coordinating an interior, it is difficult to know beforehand what the final outcome will be like. For this reason, an interior coordinating assist system is available (Patent Document 1). Specifically, parameters indicating interior style and features are designated, whereupon a set of interior components corresponding to the designated parameters is selected and images of these components are superimposed upon images of components that have already been designated. Further, in accordance with an interior proposal system, a preference map is displayed and sample coordinates are designated on the preference map. When this is done, a selection field centered on the designated coordinates is presented and a sample is displayed. The sample displayed falls within limits in which a sense of harmony will be achieved in terms of interior design (Patent Document 2). Furthermore, there is a system in which mapping of a desired texture is performed in an arrangement in which three-dimensional objects are combined with a background image in any layout (Patent Document 3).

Furthermore, there is a system in which a camera incorporated within a digital photo frame captures an image of the surroundings, the image of a picture frame suited to the indoor circumstances is selected and this image is displayed together with the photograph (Patent Document 4), and a system for displaying an image that is a good match with the interior of a room (Patent Document 5). Furthermore, there is a system in which a main image, which has been associated with a decorative image, is corrected automatically based upon information that controls image correction (Patent Document 6).

Patent Document 1: Japanese Patent No. 3040074
Patent Document 2: Japanese Patent No. 4446705
Patent Document 3: Japanese Patent Application Laid-Open No. 2003-157290
Patent Document 4: Japanese Patent No. 5477025
Patent Document 5: Japanese Patent No. 4710497
Patent Document 6: Japanese Patent Application Laid-Open No. 2007-208912

However, none of these Patent Documents give any consideration to finding an optimum picture frame by taking into account the relationship between a photograph and the background in a case where the photograph is to be placed inside a picture frame and a room is to be decorated with the picture frame. In Patent Document 1, it is necessary to set the parameters of images in advance. In Patent Document 2, interior components registered in advance are displayed on a preference map and therefore this system does not deal with arbitrary interior components. Patent Document 3 deals with a three-dimensional display and does not take interiors into account. Patent Document 4 is such that a camera captures the image of the surroundings via a shooting lens provided on the front of a digital photo frame at the lower portion thereof; the camera can only shoot what is in front of the digital photo frame. This means that no consideration whatsoever is given to the background of the digital photo frame. Patent Document 5 displays an image that is a good match with a room based upon information indicating the style, etc., of the room in which an information processing apparatus is located. As a consequence, the user cannot display a desired image. Patent Document 6 deals with image correction and does not take into account the relationship to the room that is to be decorated with the image.

SUMMARY OF THE INVENTION

An object of the present invention is to arrange it so that when a picture frame in which a photograph (image) has been inserted is to be put on display, a suitable picture frame can be selected upon taking background into account.

An image combining apparatus according to a first aspect of the present invention comprises: a background image impression category determination device (background image impression category determination means) for determining the category of an impression given by a background image representing background of a location to be decorated with a picture frame in which a print has been inserted (where the picture frame may be an actual picture frame or an image representing a picture frame in the manner of a template); a picture frame image detection device (picture frame image detection means) for finding a picture frame image that falls within the category of the impression determined by the background image impression category determination device; an image correction device (image correction means) for performing a correction that causes an image representing the print (the image used for the print) to approach a target value for each category of impression determined by the background image impression category determination device; and a combining device (combining means) for combining the image, which has been corrected by the image correction device, with a combining area of the picture frame image found by the picture frame image detection device, thereby generating a composite image.

The first aspect of the present invention also provides an image combining method. Specifically, the method comprises steps of: determining the category of an impression given by a background image representing background of a location to be decorated with a picture frame in which a print has been inserted; finding a picture frame image that falls within the category of the impression determined; performing a correction that causes an image representing the print to approach a target value for each category of impression determined; and combining the corrected image with a combining area of the picture frame image found, thereby generating a composite image.

The first aspect of the present invention also provides a recording medium storing a program for controlling the computer of an image combining apparatus.

The apparatus may further comprise an impression category information output device (impression category information output means) for outputting information representing the category of the impression determined by the background image impression category determination device, this impression category information being superimposed upon the background image.

By way of example, the background image impression category determination device may determine the category of an impression for every portion of the background image, and the image category information output device may output impression category information determined for every portion of the background image.

The apparatus may further comprise a correction method output device (correction method output means) for outputting a correction method that causes the image representing the print to approach the target value for each category of impression determined by the background image impression category determination device.

The apparatus may further comprise a corrected-image output device (corrected image output means) for outputting the image corrected by the correction method.

The apparatus may further comprise a superimposing position input device (superimposing position input means) for inputting a position on the background image on which the composite image generated by the combining device is to be superimposed.

The apparatus may further comprise a matching degree calculation device (matching degree calculation means) for calculating degree of matching between the background image and the composite image generated by the combining device.

The apparatus may further comprise a printer (printing means) for printing the composite image, which has been generated by the combining device, with the exception of the picture frame image.

An image combining apparatus according to a second aspect of the present invention comprises: a background image analysis information detection device (background image analysis information detection means) for detecting at least one item of background image analysis information from among brightness, contrast, saturation, hue, color balance and spatial frequency of a background image representing background of a location to be decorated with a picture frame in which a print has been inserted; a picture frame image detection device (picture frame image detection means) for finding a picture frame image for which degree of resemblance is equal to or greater than a threshold value, wherein the degree of resemblance is resemblance between one item of background image analysis information in the background image analysis information detected by the background image analysis information detection device and one item of picture frame analysis information, which is of a type identical with that of the one item of background image analysis information, in picture frame image analysis information consisting of brightness, contrast, saturation, hue, color balance and spatial frequency of a picture frame image representing a picture frame; and a combining device (combining means) for combining the image representing the print with the picture frame image found by the picture frame image detection device, thereby generating a composite image.

The second aspect of the present invention also provides an image combining method. Specifically, the method comprises steps of: detecting at least one item of background image analysis information from among brightness, contrast, saturation, hue, color balance and spatial frequency of a background image representing background of a location to be decorated with a picture frame in which a print has been inserted; finding a picture frame image for which degree of resemblance is equal to or greater than a threshold value, wherein the degree of resemblance is resemblance between one item of background image analysis information in the background image analysis information detected and one item of picture frame analysis information, which is of a type identical with that of the one item of background image analysis information, in picture frame image analysis information consisting of brightness, contrast, saturation, hue, color balance and spatial frequency of a picture frame image representing a picture frame; and combining the image representing the print with the picture frame image found, thereby generating a composite image.

The second aspect of the present invention also provides a recording medium storing a program for controlling the computer of an image combining apparatus.

The apparatus may further comprise: an image analysis information acquisition device (image analysis information acquisition means) for acquiring one item of image analysis information, which is of a type identical with that of one item of background image analysis information in the background image analysis information detected by the background image analysis information detection device, in image analysis information consisting of brightness, contrast, saturation, hue, color balance and spatial frequency of the image representing the print; and an image correction device (image correction means) for subjecting the image, which is to be inserted into the picture frame, to a correction that causes the value of the one item of image analysis information acquired by the image analysis information acquisition device and the value of the one item of background image analysis information to approach each other or depart from each other.

The apparatus may further comprise a printer for printing the composite image, which has been generated by the combining device, with the exception of the picture frame image.

In accordance with the first aspect of the present invention, the category of an impression given by a background image is determined, wherein the background image represents the background of a location where a picture frame in which a print has been inserted is to be put on show. A picture frame image that falls within the determined category of the impression is found. A correction is performed such that the image representing the print will approach a target value of the determined category of the impression, and the corrected image is combined with a combining area of the found picture frame image, whereby a composite image is generated.

In accordance with the first aspect of the present invention, the picture frame image takes on the same category as that of the impression given by the background of the location where the picture frame is to be exhibited, and the image to be inserted into the picture frame is corrected so as to approach the target value of the category of the impression. As a result, when the corrected image is inserted into an actual picture frame corresponding to the found picture frame image and the picture frame is put on show, both the picture frame and the print inserted into the picture frame will well match the wall, etc., of the room decorated with the picture frame. A picture frame suited to the wall or the like to be decorated can thus be found.

In accordance with the second aspect of the present invention, at least one item of background image analysis information is detected from among brightness, contrast, saturation, hue, color balance and spatial frequency of a background image representing the background of a location where a picture frame with an inserted print is to be exhibited. A picture frame image for which a degree of resemblance is equal to or greater than a threshold value is found. The degree of resemblance is that between the detected background image analysis information and picture frame image analysis information of the same type. An image is combined with the picture frame image that has been found.

In the second aspect of the present invention as well, a picture frame image that resembles the background is found. As a result, when the image is inserted into a picture frame specified by the found picture frame image and the picture frame is put on show, a good match with the background will be obtained.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 illustrates the relationship between impressions and image analysis information;

FIG. 13 illustrates result of analysis of a background image; and

FIG. 14 illustrates picture frame image analysis information.

DESCRIPTION OF THE PREFERRED EMBODIMENTS

Figure 1:
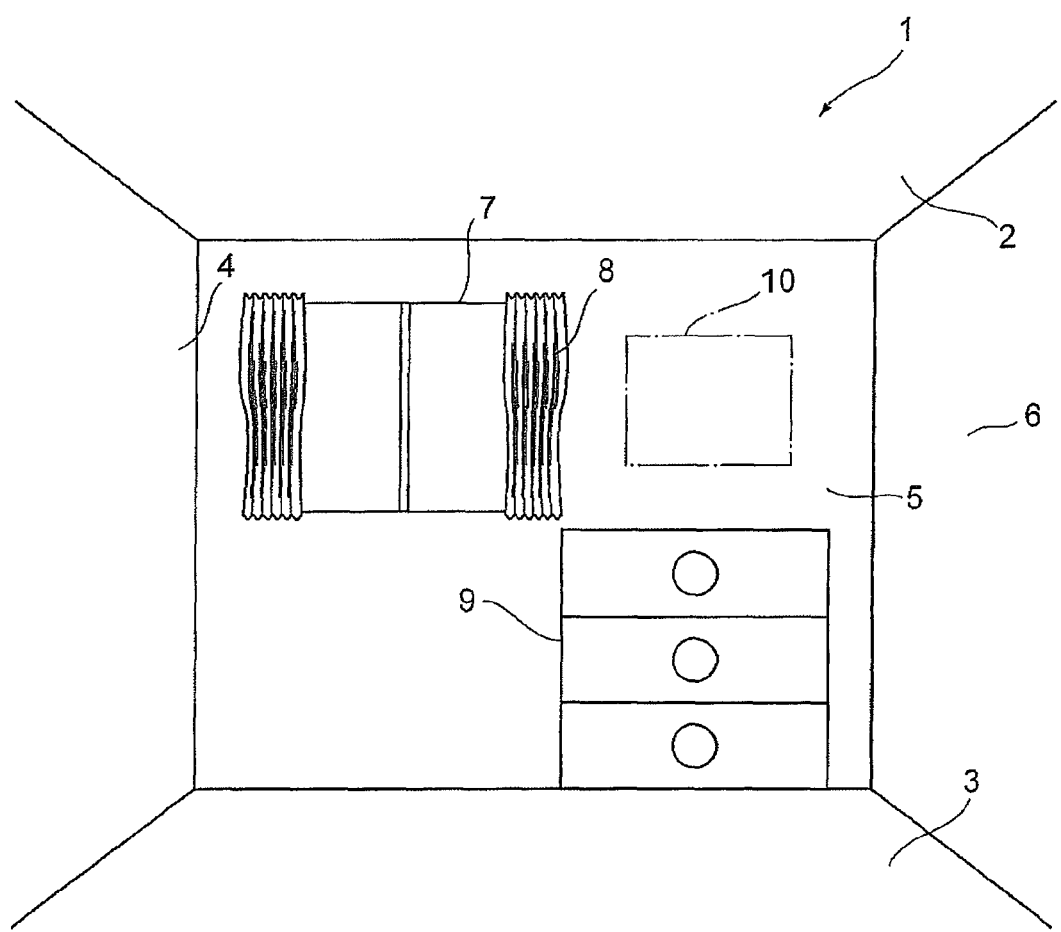
FIG. 1 is an example of the room of a user decorated with a picture frame.

FIG. 1 illustrates the appearance of a room 1.

The room 1 has a ceiling 2, a floor 3 and walls 4, 5 and 6. One wall 5 has a window 7 where a curtain 8 has been hung. A bureau 9 has been placed in the room 1. With the wall 5 as the background, consider that a print (photograph) in a picture frame is to be exhibited at a position indicated by the broken line 10. In such case the picture frame is selected upon taking into account the color of the wall 5, the window 7, the curtain 8 and the bureau 9. In this embodiment, a picture frame (the image of the picture frame) is selected taking into account the background where the picture frame having the inserted image will be put on show.

What can be decorated with the picture frame is not only the wall of a room; any place, such as an outdoor or indoor partitioning screen, may be so decorated. In any case, a picture frame (picture frame image) is selected taking into account the background of the location to be decorated with a picture frame in which a print has been inserted.

Figure 2:
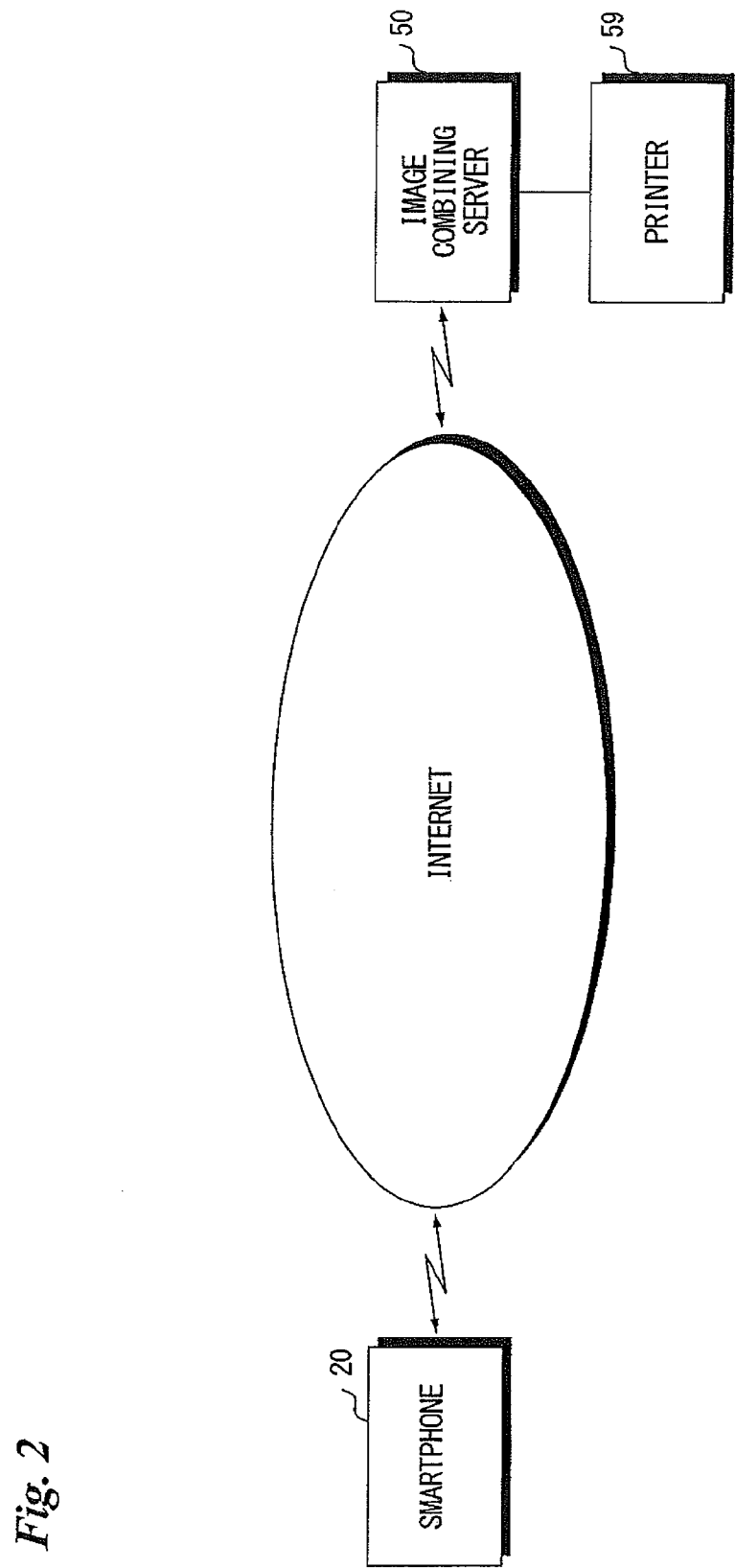
FIG. 2 illustrates an overview of an image combining system.

FIG. 2 illustrates an overview of an image combining system.

The image combining system includes a smartphone (a multifunction mobile telephone) 20 and an image combining server (image combining apparatus) 50 that are capable of communicating with each other via a network such as the Internet. It goes without saying that the system can utilize a client computer or the like instead of the smartphone 20. Connected to the image combining server 50 is a printer 59 for printing an image representing a print to be inserted into a picture frame.

Figure 3:
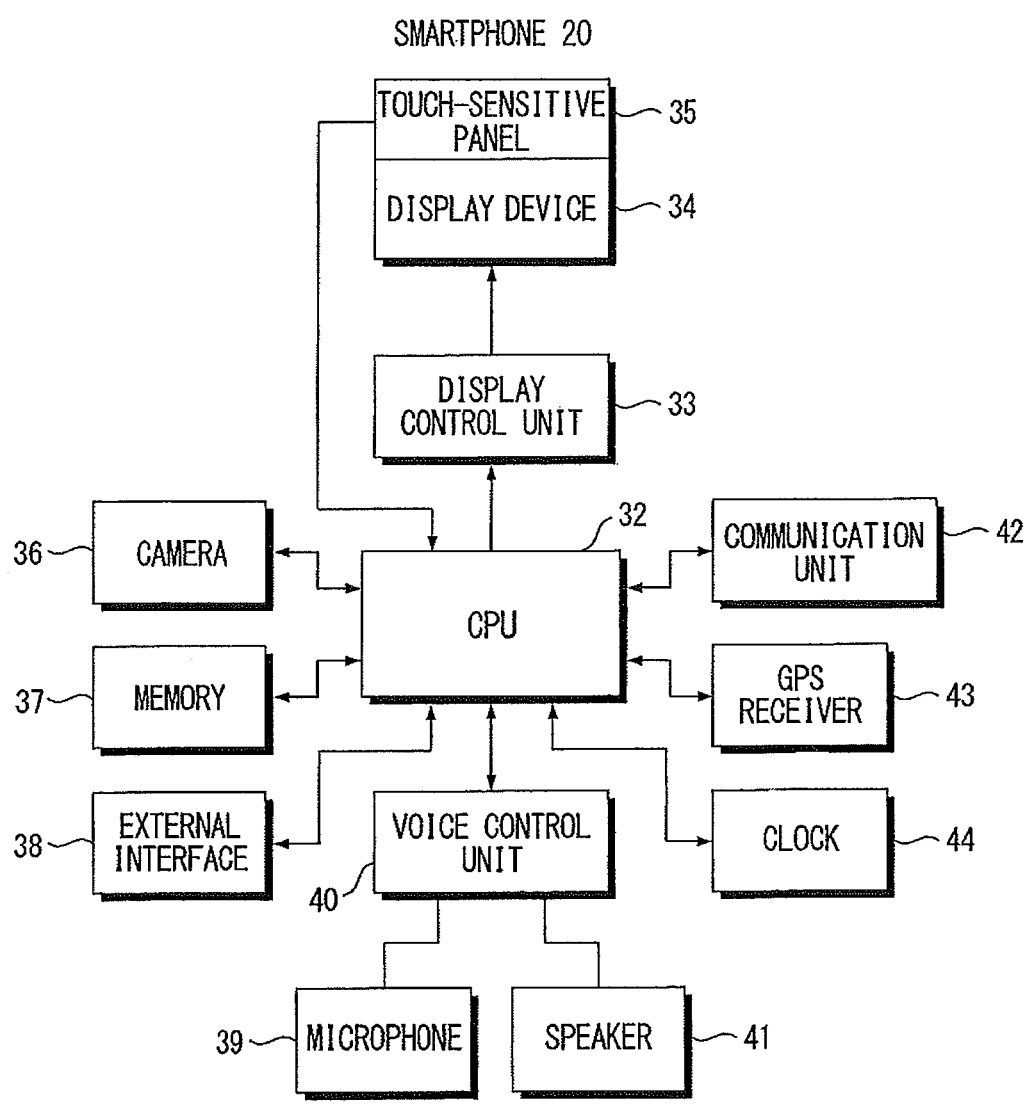
FIG. 3 is a block diagram illustrating the electrical configuration of a smartphone.

FIG. 3 is a block diagram illustrating the electrical configuration of the smartphone 20.

The overall operation of the smartphone 20 is controlled by a CPU 32.

The smartphone 20 includes a display device 34 controlled by a display control unit 33. A touch-sensitive panel 35 has been formed on the display screen of the display device 34. A command supplied from the touch-sensitive panel 35 is input to the CPU 32. The smartphone 20 further includes a camera 36, a memory 37 for storing data temporarily, and an external interface 38 for connecting to external devices. The smartphone 20 further includes a microphone 39, a voice control unit 40 and a speaker 41. The smartphone 20 further includes a communication unit 42 for connecting to, the Internet as mentioned above, a GPS (Global Positioning System) receiver 43 for detecting the location of the smartphone 20, and a clock 44.

Figure 4:
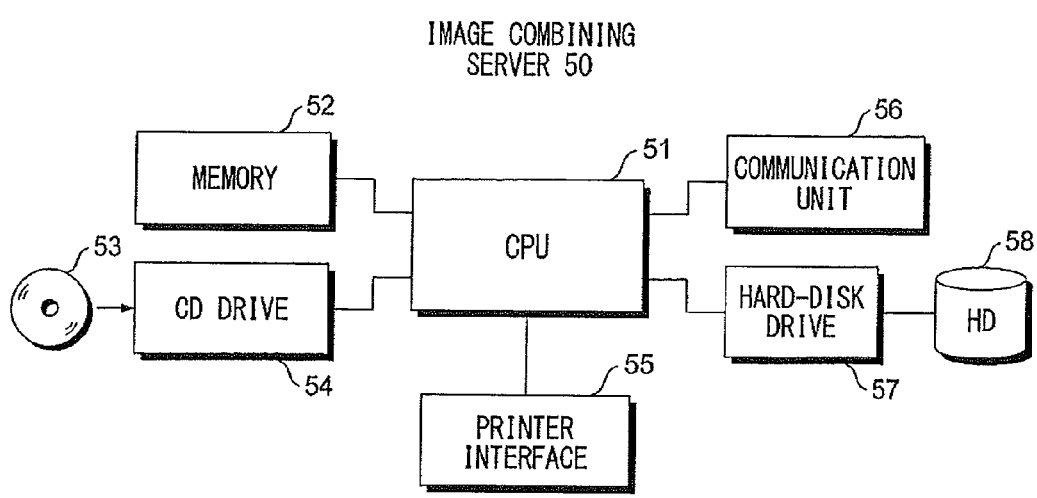
FIG. 4 is a block diagram illustrating the electrical configuration of an image combining server.

FIG. 4 is a block diagram illustrating the electrical configuration of the image combining server 50.

The overall operation of the image combining server 50 is controlled by a CPU 51.

The image combining server 50 includes a memory 52 for storing data temporarily, a compact-disc drive 54 for accessing a compact disc 53, and a printer interface 55 for connecting to the printer 59. The image combining server 50 further includes a hard disk 58 and a hard-disk drive 57 for accessing the hard disk 58.

The compact disc (recording medium) 53 on which a program for controlling operation, described later, has been stored is loaded in the image combining server 50 and the program that has been stored on the compact disc 53 is read by the compact-disc drive 54. By installing the read program in the image combining server 50, the image combining server 50 operates in a manner described later. It may be arranged so that the program that controls the image combining server 50 is received by being transmitted over the Internet instead of being read from a recording medium such as the compact disc 53.

Figure 5:
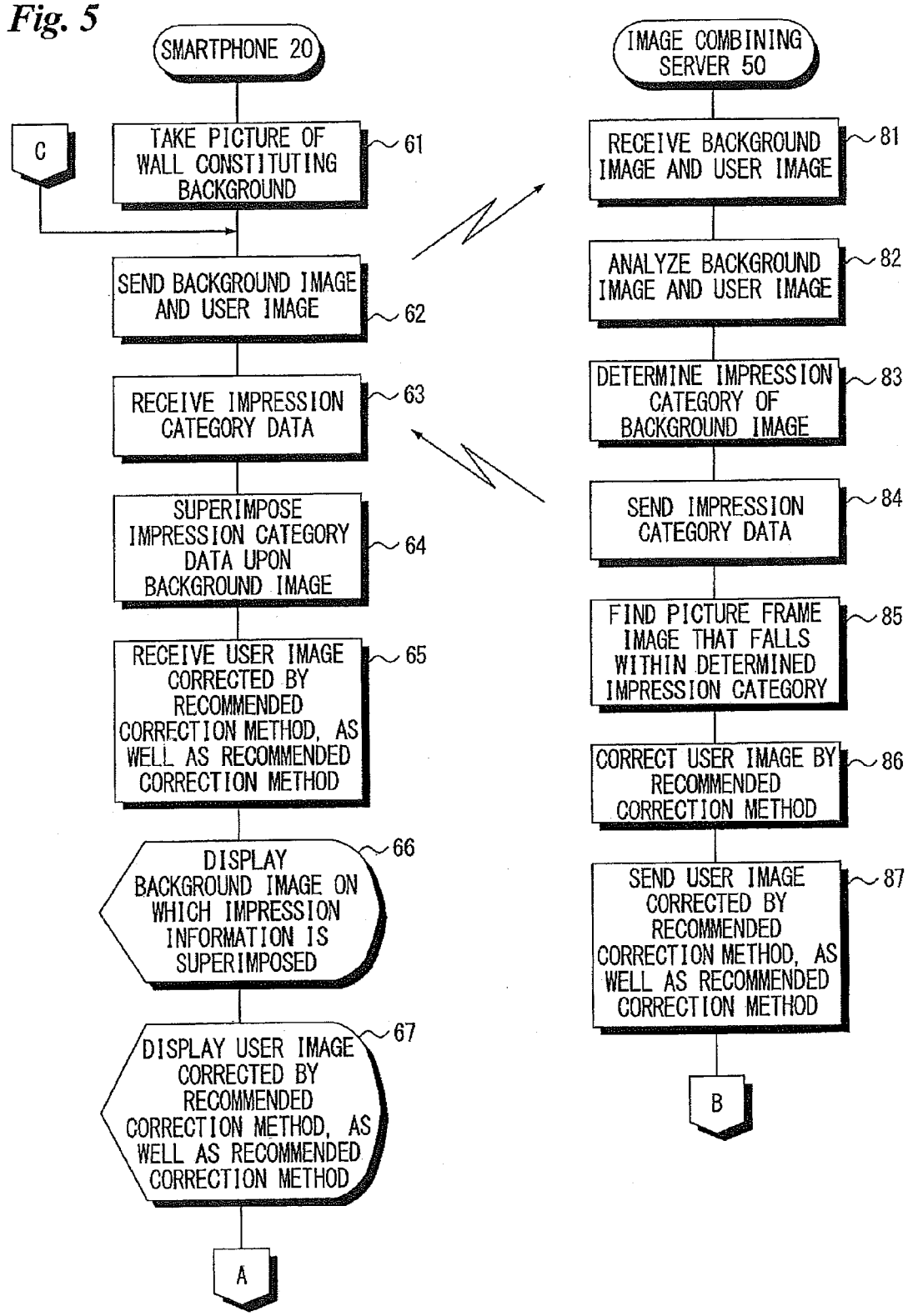
FIGS. 5 and 6 are flowcharts illustrating processing executed by the image combining system.
Figure 6:
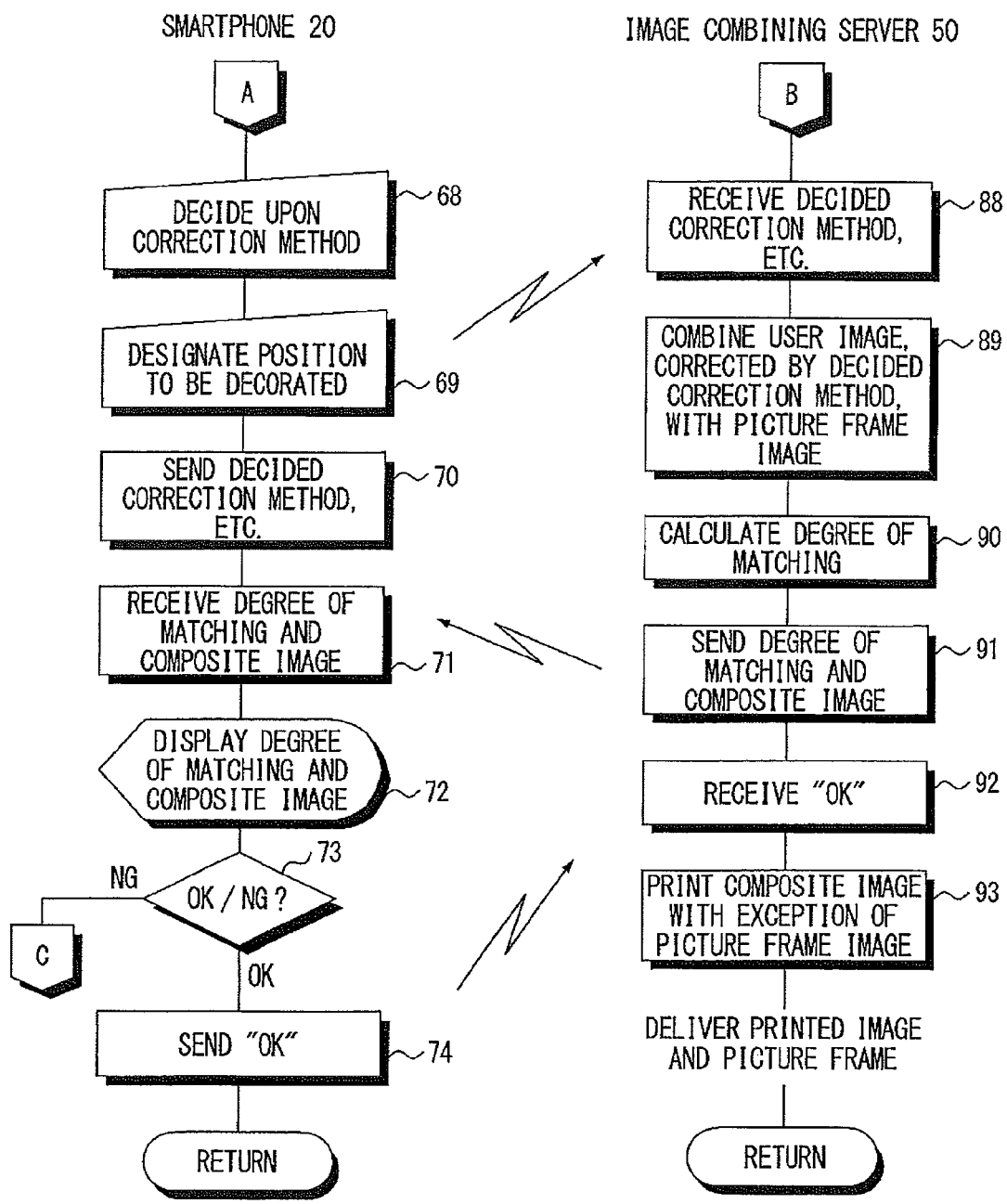

FIGS. 5 and 6 are flowcharts illustrating processing executed by the image combining system.

The user takes a picture of a wall, which constitutes the background against which a picture frame having an inserted print is to be exhibited, as mentioned above, as by using the camera of the smartphone 20 (step 61 in FIG. 5). Background image data representing the background image (the wall image-constituting the background) obtained by such photography and user image data representing the print (image) to be inserted into the picture frame is sent from the smartphone 20 to the image combining server 50 (step 62 in FIG. 5).

When the items of background image data and user image data are received by the image combining server 50 (step 81 in FIG. 5), the background image and user image are analyzed by the CPU 51 of the image combining server 50 (step 83 in FIG. 5). As a result of such analysis, the CPU 51 (background image impression category determination means) determines the category of one or multiple impressions given by the background image representing the background of the location to be decorated by the picture frame having the inserted print (step 83 in FIG. 5).

FIG. 7 illustrates an example of an impression category determination table.

The impression category determination table will have been stored in the memory 52 of the image combining server 50.

The impression category determination table stores image analysis information, which consists of brightness, contrast, saturation, hue, color balance and spatial frequency, in correspondence with impression categories. The category of an impression given by the background image is determined from the image analysis information of the background image obtained by analysis. For example, if brightness is equal to or greater than level 7 (L7) and contrast and saturation are within a range of level 3 to 5 (L3 to L5), and moreover if hue and other image analysis information also satisfy image analysis information that has been stored in correspondence with an impression category "CUTE", then it is determined that the category of the impression given by the background image is "CUTE". Only one category, or two or more categories, may be determined for impressions given. Further, it is not necessarily required that the relationship between a category of an impression and image analysis information shown in FIG. 7 be satisfied perfectly, for it may be arranged so that if the relationship is satisfied in the form of a prescribed percentage, then the category of the corresponding impression is determined as the category.

Further, it may be arranged so that the determination of the category of an impression is performed by the CPU 51 for every portion of the background image. In a case where the category of an impression is determined for every portion of a background image, analysis is executed for every portion of the background image and image analysis information is obtained for every portion of the background image. The category of an impression for every portion of the background image is obtained by the CPU 51 using the obtained image analysis information of every portion and the table shown in FIG. 7.

With reference again to FIG. 5, impression category data (impression category information) representing the determined category of the impression is transmitted from communication unit 56 (impression category information output means) (step 84). The impression category data not only expresses the impression category as a character string but also expresses the impression category by a mark. In a case where an impression category is obtained for every portion of the background image, the impression category data is sent from the image combining server 50 to the smartphone 20 together with coordinates and the like indicating to which portion of the background image the impression category pertains.

Further, a picture frame image having the determined category of the impression given by the background image is found by the CPU 51 (picture frame image detection means) of the image combining server 50 (step 85 in FIG. 5). A number of items of data representing picture frame images will have been stored in the memory 52 in correspondence with the categories of impressions given by the picture frame images. A picture frame image that gives the impression given by the background image is found from among the number of stored items of data representing the picture frame images.

When the impression category data is received by the smartphone 20 (step 63 in FIG. 5), the impression category information (character string, mark, etc.) represented by the impression category data is superimposed upon the background image by the CPU 32 of the smartphone 20 (step 64 in FIG. 5).

Further, in the image combining server 50, the user image to be placed in the picture frame is corrected by the CPU 51 in accordance with a recommended correction method in such a manner that the user image will approach a target value of the determined category of the impression given by the background image (step 86 in FIG. 5). Since image analysis information has been obtained owing to analysis of the user image, the user image is corrected so as to approach a value (target value) of the image analysis information that corresponds to the impression category stored in the table shown in FIG. 7. For example, assume a case where the category of the impression given by the background image is "CUTE". When the user image will take on a cute impression if a correction that increases (or decreases) brightness is applied to the user image, one recommended correction method is a brightness correction. Operation is similar in other cases as well. Further, in a case where the category of an impression given by a background image has been detected for every portion of the background image, a correction is applied using a recommended correction method in such a manner that the target value of the category of each respective portion will be approached. The user image corrected by the recommended correction method and the recommended correction method are sent from the image combining server 50 (correction method output means and corrected image output means) to the smartphone 20 by the communication unit 56 (step 87 in FIG. 5).

The user image corrected by the recommended correction method and the recommended correction method are received by the smartphone 20 (step 65 in FIG. 5). The background image upon which the impression category information is superimposed is displayed on the display screen of the display device 34 of the smartphone 20 (step 66 in FIG. 5).

Figure 8:
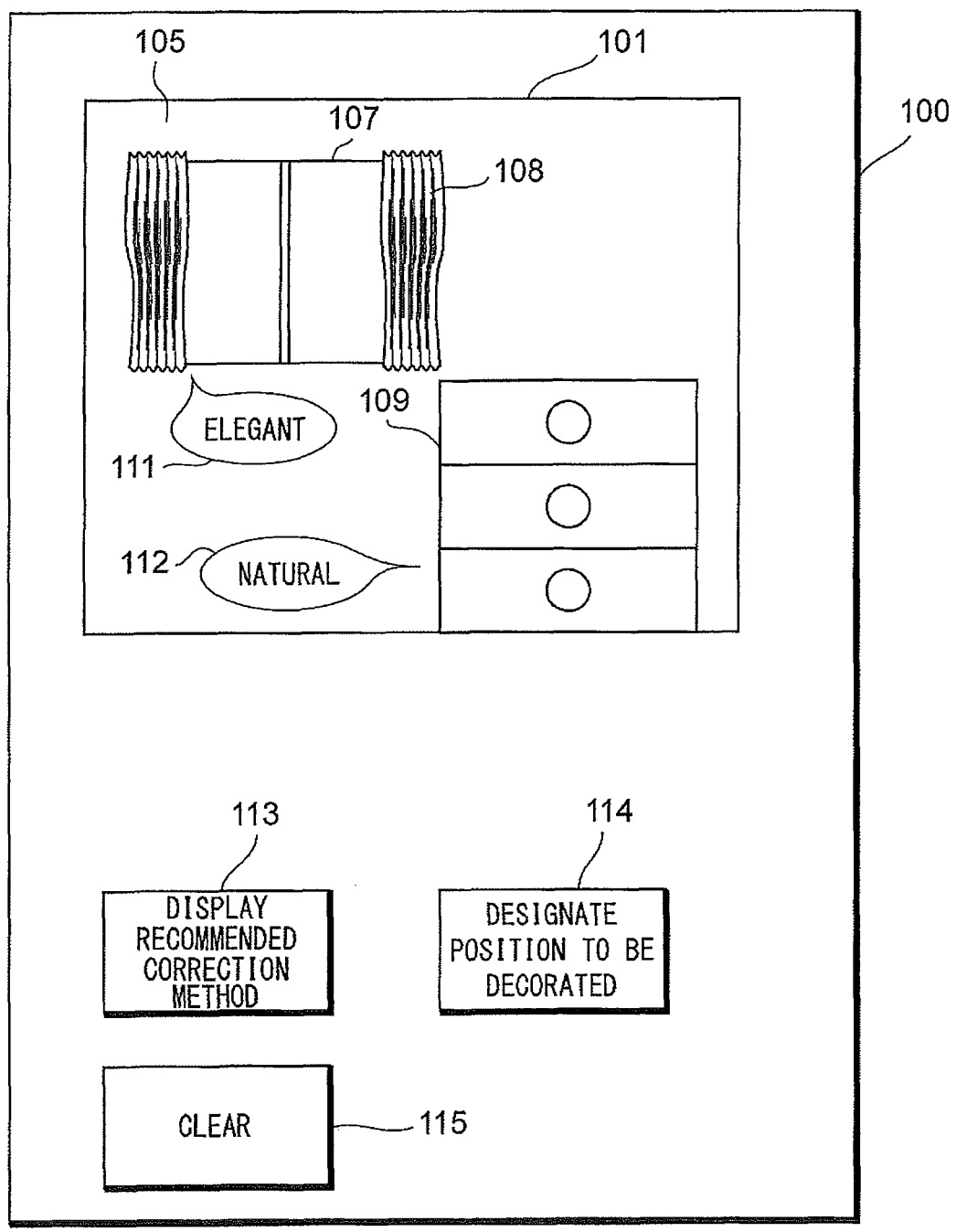
FIGS. 8 to 11 are examples of display screens on a smartphone.

FIG. 8 is an example of a display screen on the smartphone 20.

A background image 101 is being displayed on the display screen 100 of the smartphone 20. The background image 101 represents the image of the wall 5 shown in FIG. 1. The background image 101 includes a wall image 105 corresponding to the wall 5 shown in FIG. 1, a window image 107 corresponding to the window 7, a curtain image 108 corresponding to the curtain 8, and a bureau image 109 corresponding to the bureau 9. A character string reading "ELEGANT" is being displayed in a balloon 111 as the impression category corresponding to the portion consisting of the curtain image 108, and a character string reading "NATURAL" is being displayed in a balloon 112 as the impression category corresponding to the portion consisting of the bureau image 109. It may be arranged so that the impression category corresponding to the portion consisting of the wall image 105 is displayed, or it may be arranged so that the overall impression category of the entire background image 101 is displayed rather than the impression categories of the various portions.

Displayed below the background image 101 are a recommended correction method display command button 113 on which a character string reading "DISPLAY RECOMMENDED CORRECTION METHOD" is being displayed, a position designation button 114 on which a character string reading "DESIGNATE POSITION TO BE DECORATED" is being displayed, and a clear button 115 on which a character string reading "CLEAR" is being displayed.

When the recommended correction method display command button 113 is touched by the user, the user image that has been corrected by recommended correction methods, as well as the recommended correction methods, is displayed on the display screen 100 (step 67 in FIG. 5).

Figure 9:
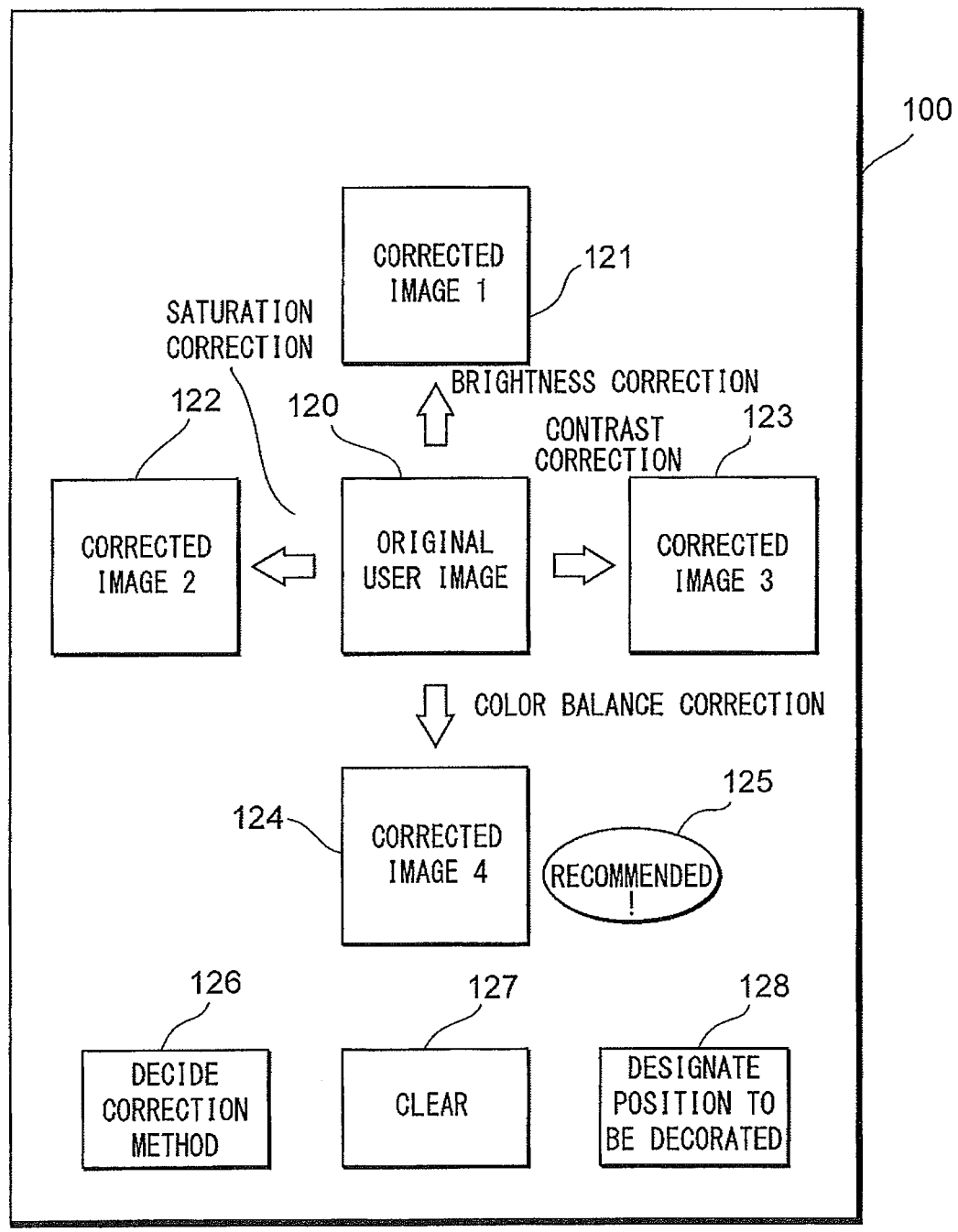

FIG. 9 is an example of the display screen 100 of the smartphone 20 on which the user image corrected by the recommended correction methods, as well as the recommended correction methods, is displayed.

An as yet uncorrected user image (original user image) 120 is being displayed at the approximate center of the display screen 100. In the example shown in FIG. 9, a brightness correction, a saturation correction, a contrast correction and a color balance correction are exemplified as recommended correction methods. It goes without saying that if there are other recommended correction methods, then these recommended correction methods would also be displayed.

A first corrected image 121, which is the result of correcting the brightness of the original user image, is being displayed above the original user image 120. A second corrected image 122, which is the result of correcting the saturation of the original user image, is being displayed on the left side of the original user image 120. A third corrected image 123, which is the result of correcting the contrast of the original user image, is being displayed on the right side of the original user image 120. A fourth corrected image 124, which is the result of correcting the color balance of the original user image, is being displayed below the original user image 120. Assume that the fourth corrected image 124 is the optimum corrected image among the corrected images 121 to 124. In order to recommend the fourth corrected image 124 in such case, a balloon in which a character string reading "RECOMMENDED!" is being displayed is displayed alongside the fourth corrected image 124. For example, the optimum corrected image is the corrected image for which the image analysis characteristic of the user image after the correction thereof will be closest to the image analysis characteristic of the background image or of a portion of the background image.

Displayed below the display screen 100 are a correction method decision button 126 on which a character string reading "DECIDE CORRECTION METHOD" is being displayed, a clear button 127 on which a character string reading "CLEAR" is being displayed, and a position designation button 128 on which a character string reading "DESIGNATE POSITION TO BE DECORATED" is being displayed.

If a desired corrected image among the first corrected image 121 to fourth corrected image 124 is touched by the user and, moreover, the correction method decision button 126 is pressed by the user, a correction method is decided (step 68 in FIG. 6). If the clear button 127 is pressed, the fact that the corrected image has been touched is cleared. When the correction method is decided, the position designation button 128 is pressed. In response, the background image 101 is displayed on the display screen of the smartphone 20 again and the display position of the picture frame image in which an image has been inserted is designated in the background image 101 (step 69 in FIG. 6).

Figure 10:
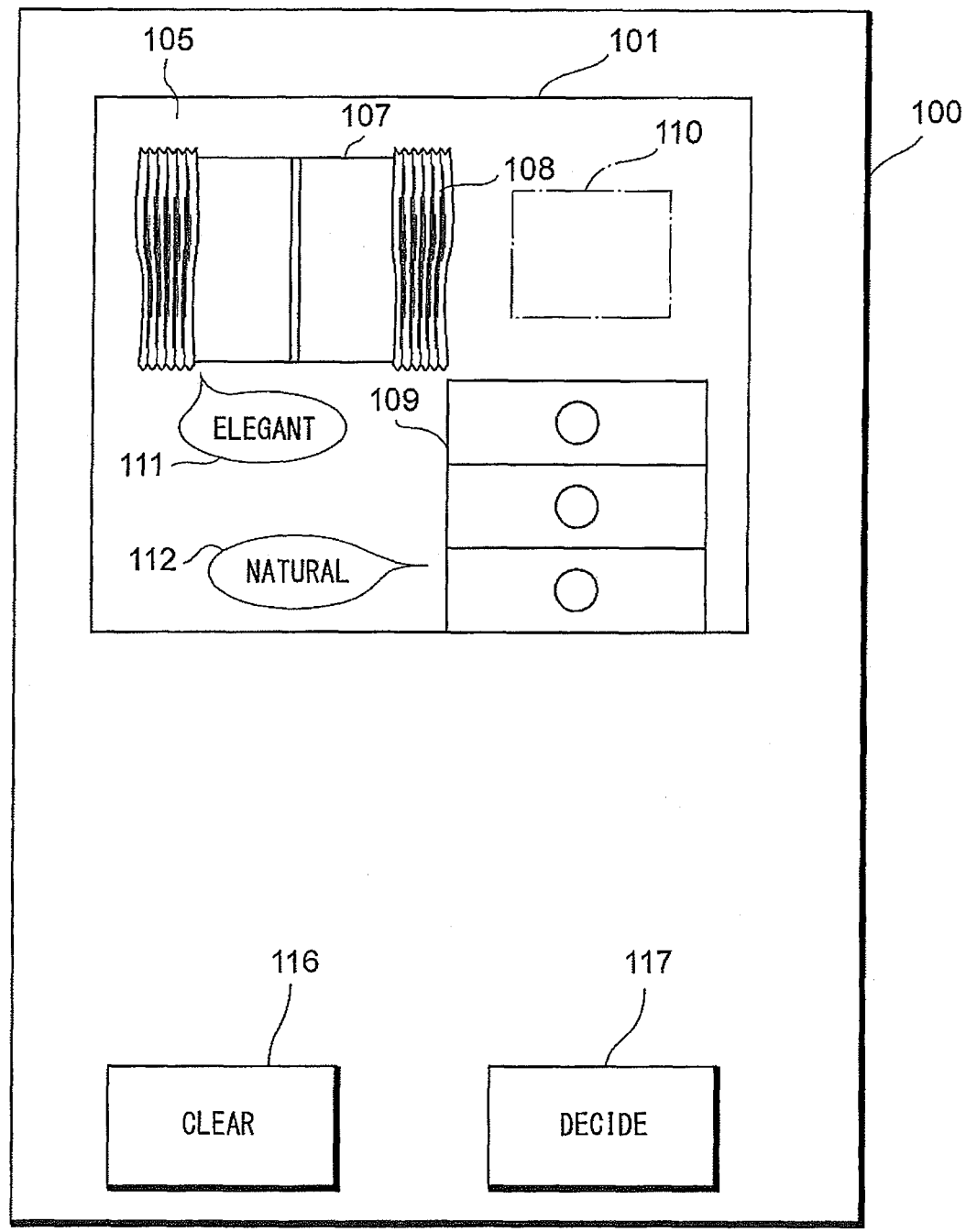

FIG. 10 is an example of the display screen 100 on the smartphone 20.

The background image 101 is being displayed on the display screen 100, as mentioned above. The display position of the picture frame image is designated in the background image 101 by touching the position on the touch-sensitive panel 35. For example, if a position on the right side of the window image 107 and, moreover, above the bureau image 109 is designated as the display position, the display position 101 will be indicated by a broken line (although another method of display may just as well be used).

Displayed below the background image 101 are a clear button 116 on which a character string reading "CLEAR" is being displayed and a decision button 117 on which a character string reading "DECIDE" is being displayed. If the clear button 116 is pressed, the designated position is cleared. If the decision button 117 is pressed, data indicating the decided correction method as well as the position to be decorated with the picture frame image is sent from the smartphone 20 to the image combining server 50 (step 70 in FIG. 6).

The data sent from the smartphone 20 indicating the correction method and position to be decorated with the picture frame image is received by the communication unit 56 of the image combining server 50 (step 88 in FIG. 6). (A position at which a composite image, described later, is to be superimposed is input, this being performed by superimposing position input means.) The CPU 51 (combining means) combines the user image corrected by the decided correction method with a combining area of the found picture frame image, thereby generating a composite image (step 89 in FIG. 6).

Next, the composite image is combined with the background image at the designated position thereon and the degree of matching between the composite image and background image is calculated by the CPU 51 (matching degree calculation means) (step 90 in FIG. 6). The composite image constituting the picture frame image with the inserted image is subjected to image analysis. The greater the resemblance between image analysis information obtained by image analysis and the background image, the higher the degree of matching. Further, it may be arranged so that, in the background image, the greater the resemblance between the image analysis information of the wall image 105 around the designated position of the picture frame image (composite image) (around the position indicated by the broken line 110 in the case of FIG. 10) and the image analysis information of the composite image, the higher the degree of matching.

The calculated degree of matching and the composite image are sent from the image combining server 50 to the smartphone 20 (step 91 in FIG. 6).

When the degree of matching and the composite image sent from the image combining server 50 are received by the smartphone 20 (step 71 in FIG. 6), the degree of matching is displayed on the display screen 100 of the smartphone 20 on the background image upon which the composite image has been superimposed (step 72 in FIG. 6).

Figure 11:
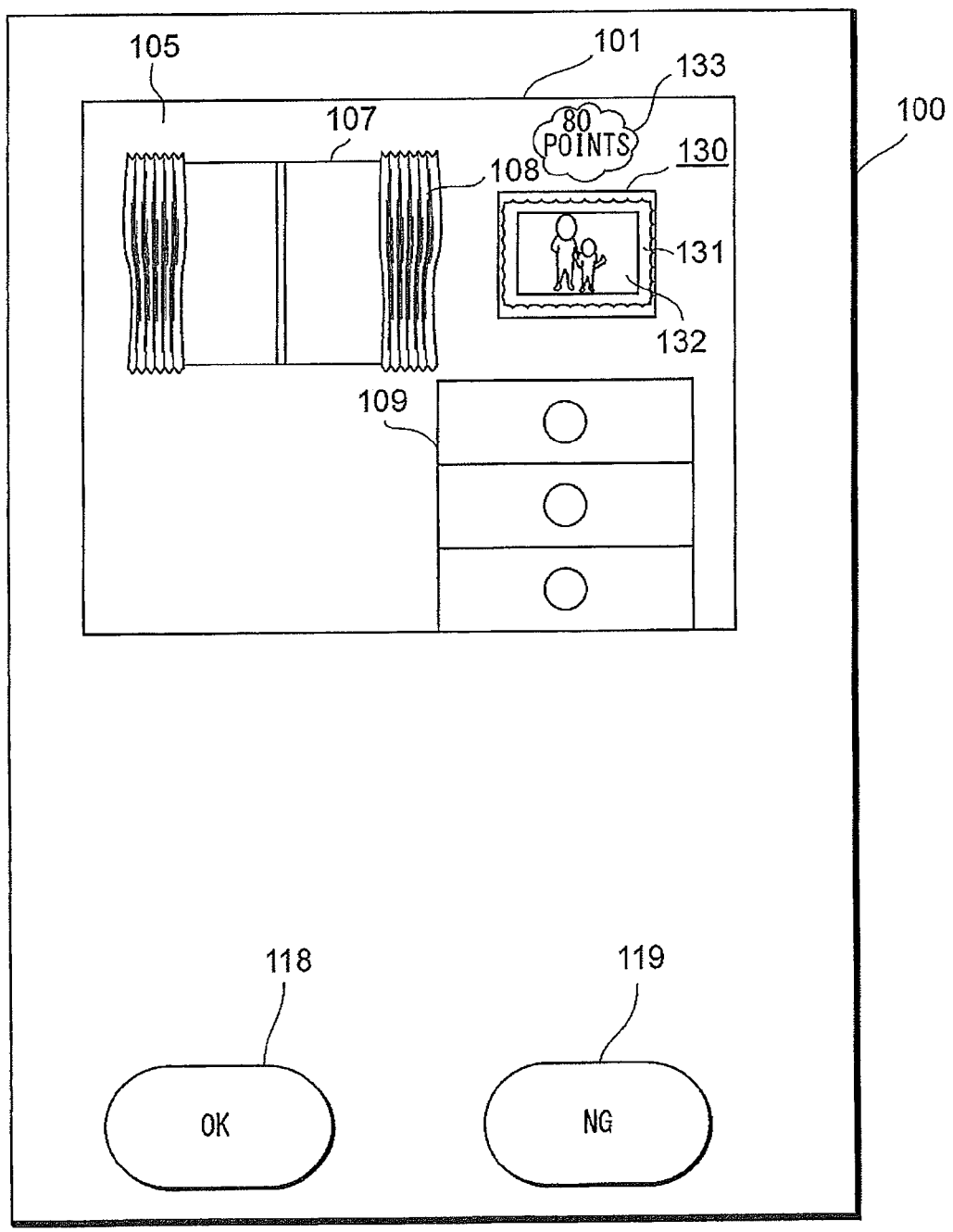

FIG. 11 is an example of the display screen 100 on the smartphone 20.

The background image 101 is being displayed on the display screen 100. A composite image 130 has been combined with the background image 101 at the designated position. The composite image is that obtained by combining a user image 132, which has been corrected, with the combining area of a picture frame image 131, which has been found. A score 133, which serves as the degree of matching, is being displayed above the composite image 130.

Displayed below the background image 101 are an OK button 118 on which a character string reading "OK" is being displayed, and an NG button 119 on which a character string reading "NG" is being displayed. If the composite image 130 is as intended by the user, the user presses the OK button 118 (step 73 in FIG. 6). In response, data indicative of OK is sent from the smartphone 20 to the image combining server 50 (step 74 in FIG. 6). If the composite image 130 is not as intended by the user (step 73 in FIG. 6), processing from step 62 (FIG. 5) onward is repeated. As a result, the determination of the picture frame image and correction method is performed again.

When the data indicative of OK sent from the smartphone 20 is received by the image combining server 50 (step 92 in FIG. 6), the printer 59 prints the composite image 130 with the exception of the picture frame image 131, i.e., the printer 59 prints the corrected user image 132 (step 93 in FIG. 6). The print thus obtained is delivered to the user upon being placed in the actual picture frame specified by the picture frame image that has been found.

Upon accepting the picture frame in which the print (photograph) has been placed, the user exhibits the picture frame at the designated position 10 on the wall 5 shown in FIG. 1. Since such a simulation has been performed beforehand on the smartphone. 20, the picture frame having the inserted print will match the wall 5 when the wall 5 is decorated with the picture frame.

In the foregoing embodiment, it may be arranged so that, in a case where multiple background-image impression categories are displayed, as shown in FIG. 8, the user of the smartphone 20 can select a desired impression category from among the multiple impression categories. For example, by touching the balloon 111 or 112, the impression category expressed by the touched balloon is selected. Data representing the selected impression category is sent from the smartphone 20 to the image combining server 50. When the data representing the selected impression category is received by the image combining server 50, the impression category represented by the received data is decided upon as the impression category of the background image (step 83 in FIG. 5). A picture frame image that falls within the impression category thus determined is found (step 85 in FIG. 5).

Figure 12:
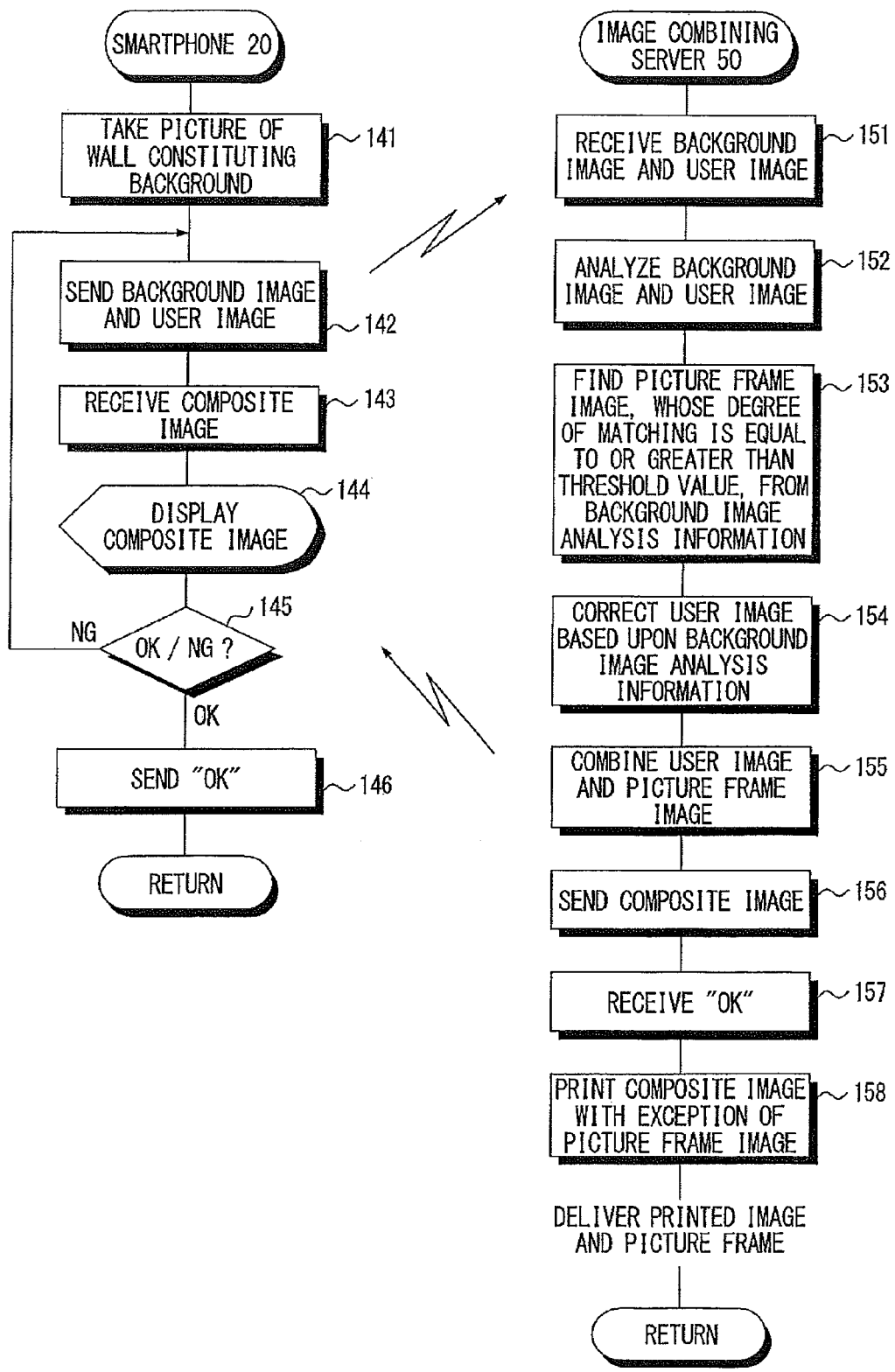
FIG. 12 is a flowchart illustrating processing executed by the image combining system.

FIGS. 12 to 14 illustrate another embodiment. This embodiment also is capable of utilizing the image combining system shown in FIGS. 2 to 4.

FIG. 12 is a flowchart illustrating processing executed by the image combining system.

The user takes a picture of a background wall at a location to be decorated with a picture frame having an inserted print (step 141), as described above. The background image and a user image representing the print to be inserted into the picture frame are sent from the smartphone 20 to the image combining server 50 (step 142).

When the background image and the user image sent from the smartphone 20 are received by the image combining server 50 (step 151), the background image and user image are analyzed by the CPU 51 (background image analysis information detection means, image analysis information acquisition means) and, from among the brightness, contrast, saturation, hue, color balance and spatial frequency of the background image, the CPU 51 selects at least one item of image analysis information with regard to the background image and user image (step 152). As a result, one item of user image analysis information of the same type as that of the one item of background image analysis information in the detected background image analysis information is acquired in the user image analysis information consisting of the brightness, contrast, saturation, hue, color balance and spatial frequency of the user image to be inserted into the picture frame.

FIG. 13 illustrates the result of analysis of the background image.

Image analysis information consisting of brightness, contrast, saturation, hue, color balance and spatial frequency has been detected as the result of analyzing the background image. As set forth above, however, it will suffice if at least one item of image analysis information is obtained from among these items of image analysis information.

A picture frame image for which a degree of resemblance is equal to or greater than a threshold value is found by the CPU 51 (picture frame image detection device) (step 153), wherein the degree of resemblance is resemblance between one item of background image analysis information in the detected background image analysis information and one item of picture frame analysis information, which is of a type identical with that of the one item of background image analysis information, in picture frame image analysis information consisting of brightness, contrast, saturation, hue, color balance and spatial frequency of a picture frame image representing a picture frame.

FIG. 14 is an example of a picture frame image analysis information table.

Picture frame images are identified by picture image numbers. Here image analysis information such as brightness has been obtained for each picture frame image.

By utilizing the table shown in FIG. 14, a picture frame image having, for example, a brightness for which the degree of resemblance with the brightness of the background image is equal to or greater than a threshold value is found. By way of example, the degree of resemblance can be the ratio of analysis information of the picture frame image to analysis information of the background image. If the two items of information agree, then the degree of resemblance is 100%. The closer the analysis information possessed by the picture frame image is to the analysis information of the background image, the higher the degree of resemblance.

With reference again to FIG. 12, the CPU 51 (image correction means) subjects the user image, which represents the print to be inserted into the picture frame, to a correction that causes the value of one item of user image analysis information and the value of one item of background image analysis information, which is background image analysis information of the same type as that of the user image analysis information, to approach each other or depart from each other (step 154 in FIG. 12).

The user image representing the print to be inserted into the picture frame is combined with the found picture frame image by the CPU 51 (combining means) (step 155 in FIG. 12), whereby a composite image is generated. The generated composite image is sent from the image combining server 50 to the smartphone 20 (step 156).

When the composite image is received by the smartphone 20 (step 143), the composite image is superimposed upon the background image and the result is displayed on the display screen 100 of the smartphone 20 (step 144). If the composite image is as intended by the user, then, as described above, the user presses the OK button and the data indicative of OK is sent from the smartphone 20 to the image combining server 50 (steps 145, 146). If the composite image differs from what is intended by the user, then the user presses the NG button and processing from step 142 onward is repeated (step 145). It goes without saying that the OK button and NG button are displayed on the display screen 100 of the smartphone 20, as illustrated in FIG. 11.

When the OK data sent from the smartphone 20 is received by the image combining server 50 (step 157), the user image, namely the composite image from which the picture frame image has been excluded, is printed by the printer 59 (printing means) (step 158). The print is delivered to the user upon being inserted into an actual picture frame that corresponds to the picture frame image that has been found.

In the foregoing embodiment, a print is inserted into an actual frame. However, instead of using an actual picture frame, it may be arranged so as to combine a user image with a template image as in the manner of an image representing a picture frame. In such case as well, the category of an impression given by a background image, which represents background to be decorated with a picture frame image with which a user image will be combined, can be determined, a picture frame image that falls within the determined category of the impression can be found, a correction can be performed such that the user image to be combined with the picture frame image will approach a target value of each category of impression given by the background image, and the corrected user image can be combined with the picture frame image. A single print may be made of the resultant composite image.

As many apparently widely different embodiments of the present invention can be made without departing from the spirit and scope thereof, it is to be understood that the invention is not limited to the specific embodiments thereof except as defined in the appended claims.

What is claimed is:

1. An image combining apparatus comprising:
 a background image impression category determination device for determining the category of an impression given by a background image representing background of a location to be decorated with a picture frame in which a print has been inserted;
 a picture frame image detection device for finding a picture frame image that falls within the category of the impression determined by said background image impression category determination device;
 an image correction device for performing a correction that causes an image representing the print to approach a target value for each category of impression determined by said background image impression category determination device; and
 a combining device for combining the image, which has been corrected by said image correction device, with a combining area of the picture frame image found by said picture frame image detection device, thereby generating a composite image.

2. The apparatus according to claim 1, further comprising an impression category information output device for outputting information representing the category of the impression determined by said background image impression category determination device, this impression category information being superimposed upon the background image.

3. The apparatus according to claim 2, wherein said background image impression category determination device determines the category of an impression for every portion of the background image; and
 said image category information output device outputs impression category information determined for every portion of the background image.

4. The apparatus according to claim 1, further comprising a correction method output device for outputting a correction method that causes the image representing the print to approach the target value for each category of impression determined by said background image impression category determination device.

5. The apparatus according to claim 4, further comprising a corrected-image output device for outputting the image corrected by said correction method.

6. The apparatus according to claim 1, further comprising a superimposing position input device for inputting a position on the background image on which the composite image generated by said combining device is to be superimposed.

7. The apparatus according to claim 1, further comprising a matching degree calculation device for calculating degree of matching between the background image and the composite image generated by said combining device.

8. The apparatus according to claim 1, further comprising a printer for printing the composite image, which has been generated by said combining device, with the exception of the picture frame image.

9. An image combining apparatus comprising:
 a background image analysis information detection device for detecting at least one item of background image analysis information from among brightness, contrast, saturation, hue, color balance and spatial frequency of a background image representing background of a location to be decorated with a picture frame in which a print has been inserted;
 a picture frame image detection device for finding a picture frame image for which degree of resemblance is equal to or greater than a threshold value, wherein the degree of resemblance is resemblance between one item of background image analysis information in the background image analysis information detected by said background image analysis information detection device and one item of picture frame analysis information, which is of a type identical with that of the one item of background image analysis information, in picture frame image analysis information consisting of brightness, contrast, saturation, hue, color balance and spatial frequency of a picture frame image representing a picture frame; and
 a combining device for combining the image representing the print with the picture frame image found by said picture frame image detection device, thereby generating a composite image.

10. The apparatus according to claim 9, further comprising:
 an image analysis information acquisition device for acquiring one item of image analysis information, which is of a type identical with that of one item of background image analysis information in the background image analysis information detected by said background image analysis information detection device, in image analysis information consisting of brightness, contrast, saturation, hue, color balance and spatial frequency of the image representing the print; and
 an image correction device for subjecting the image, which is to be inserted into the picture frame, to a correction that causes the value of the one item of image analysis information acquired by said image analysis information acquisition device and the value of the one item of background image analysis information to approach each other or depart from each other.

11. The apparatus according to claim 9, further comprising a printer for printing the composite image, which has been generated by said combining device, with the exception of the picture frame image.

12. An image combining method comprising steps of:
 determining the category of an impression given by a background image representing background of a location to be decorated with a picture frame in which a print has been inserted;
 finding a picture frame image that falls within the category of the impression determined, wherein the picture frame image represents the picture frame;

performing a correction that causes image analysis information of an image representing the print to approach a target value for each category of impression determined; and combining the corrected image with a combining area of the picture frame image found, thereby generating a composite image.

13. A non-transitory recording medium storing a computer-readable program for controlling a computer of an image combining apparatus, said program controlling the computer of the image combining apparatus so as to:

determine the category of an impression given by a background image representing background of a location to be decorated with a picture frame in which a print has been inserted;

find a picture frame image that falls within the category of the impression determined, wherein the picture frame image represents the picture frame;

perform a correction that causes image analysis information of an image representing the print to approach a target value for each category of impression determined; and combine the corrected image with a combining area of the picture frame image found, thereby generating a composite image.

14. An image combining method comprising steps of:

detecting at least one item of background image analysis information from among brightness, contrast, saturation, hue, color balance and spatial frequency of a background image representing background of a location to be decorated with a picture frame in which a print has been inserted;

finding a picture frame image for which degree of resemblance is equal to or greater than a threshold value, wherein the degree of resemblance is resemblance between one item of background image analysis information in the background image analysis information detected and one item of picture frame analysis information, which is of a type identical with that of the one item of background image analysis information, in picture frame image analysis information consisting of brightness, contrast, saturation, hue, color balance and spatial frequency of a picture frame image representing a picture frame; and combining the image representing the print with the picture frame image found, thereby generating a composite image.

15. A non-transitory recording medium storing a computer-readable program for controlling a computer of an image combining apparatus, said program controlling the computer of the image combining apparatus so as to:

detect at least one item of background image analysis information from among brightness, contrast, saturation, hue, color balance and spatial frequency of a background image representing background of a location to be decorated with a picture frame in which a print has been inserted;

finding a picture frame image for which degree of resemblance is equal to or greater than a threshold value, wherein the degree of resemblance is resemblance between one item of background image analysis information in the background image analysis information detected and one item of picture frame analysis information, which is of a type identical with that of the one item of background image analysis information, in picture frame image analysis information consisting of brightness, contrast, saturation, hue, color balance and spatial frequency of a picture frame image representing a picture frame; and combine the image representing the print with the picture frame image found, thereby generating a composite image.

16. An image combining apparatus comprising:

a background image impression category determination processor for determining the category of an impression given by a background image representing background of a location to be decorated with a picture frame in which a print has been inserted;

a picture frame image detection processor for finding a picture frame image that falls within the category of the impression determined by said background image impression category determination processor;

an image correction processor for performing a correction that causes an image representing the print to approach a target value for each category of impression determined by said background image impression category determination processor; and a combining processor for combining the image, which has been corrected by said image correction processor, with a combining area of the picture frame image found by said picture frame image detection processor, thereby generating a composite image.

17. An image combining apparatus comprising:

a background image analysis information detection processor for detecting at least one item of background image analysis information from among brightness, contrast, saturation, hue, color balance and spatial frequency of a background image representing background of a location to be decorated with a picture frame in which a print has been inserted;

a picture frame image detection processor for finding a picture frame image for which degree of resemblance is equal to or greater than a threshold value, wherein the degree of resemblance is resemblance between one item of background image analysis information in the background image analysis information detected by said background image analysis information detection processor and one item of picture frame analysis information, which is of a type identical with that of the one item of background image analysis information, in picture frame image analysis information consisting of brightness, contrast, saturation, hue, color balance and spatial frequency of a picture frame image representing a picture frame; and a combining processor for combining the image representing the print with the picture frame image found by said picture frame image detection processor, thereby generating a composite image.

* * * * *